Jan. 24, 1950 F. W. McCONNEL ET AL 2,495,417
GRAIN HARVESTING MACHINE
Filed Jan. 2, 1945 4 Sheets-Sheet 3
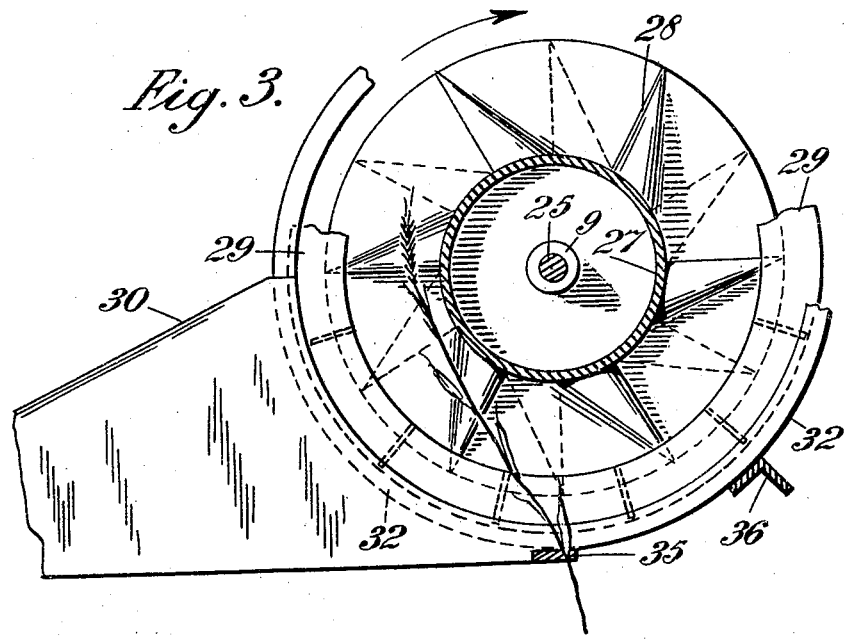
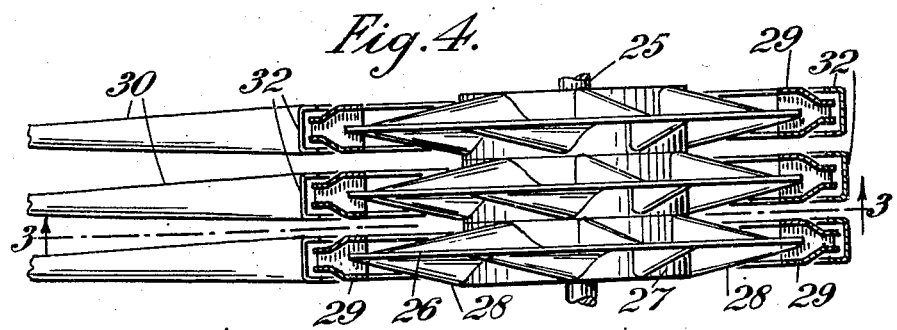
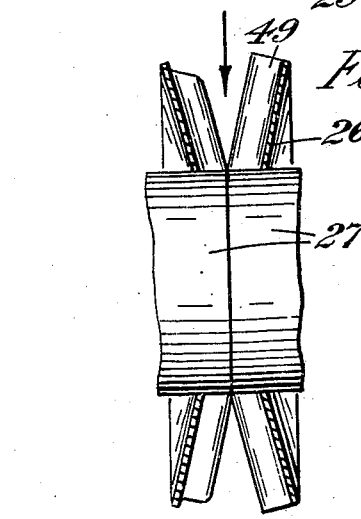
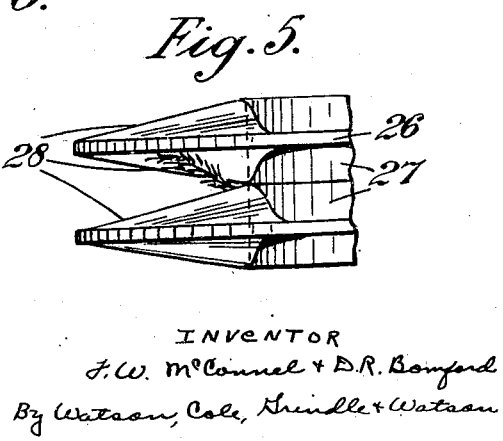
INVENTOR
F. W. McConnel & D. R. Bomford
By Watson, Cole, Grindle & Watson

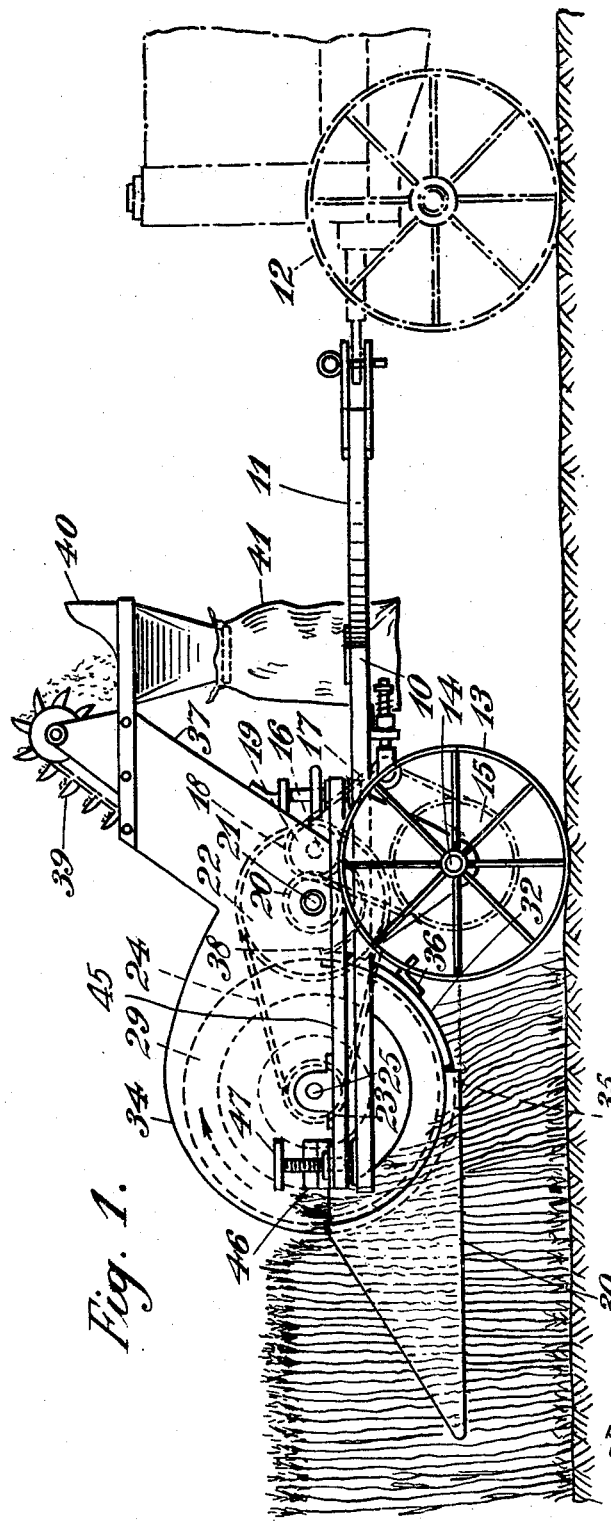

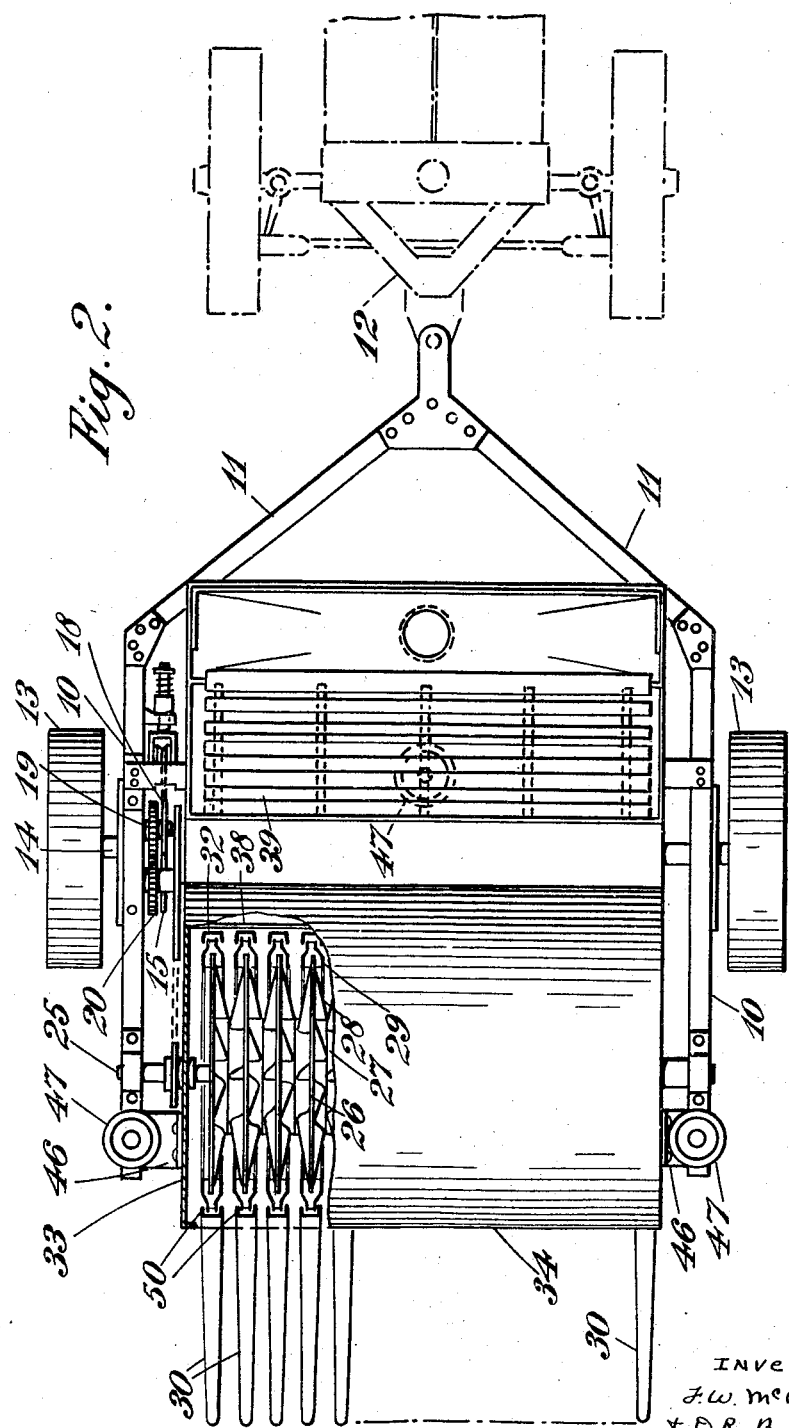

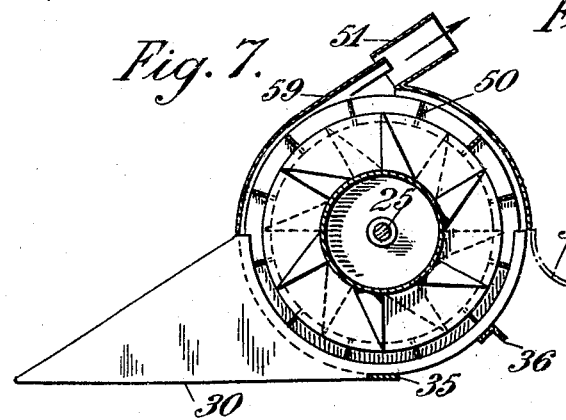
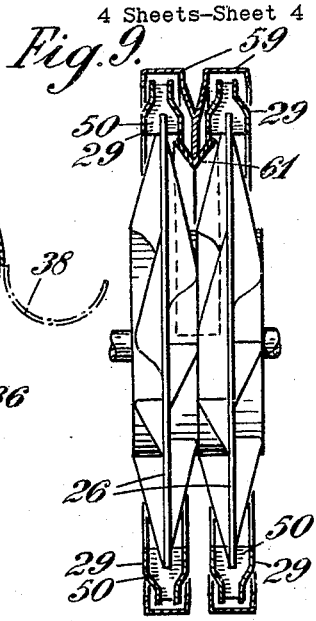
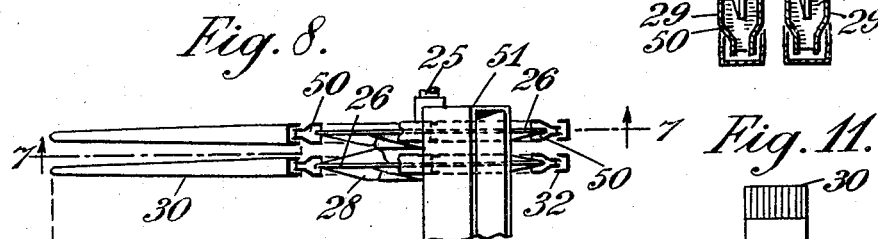
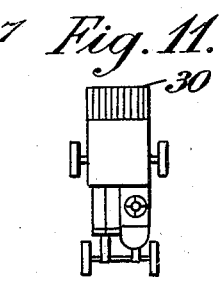
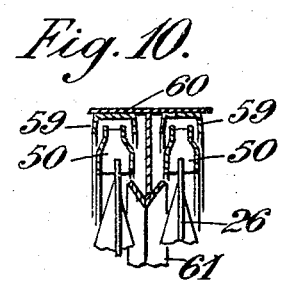
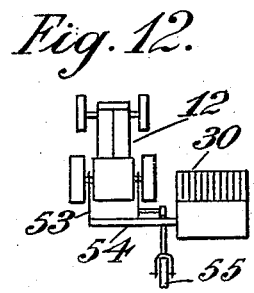
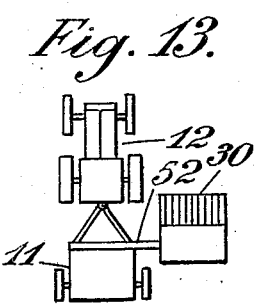
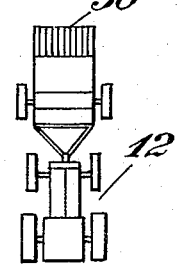
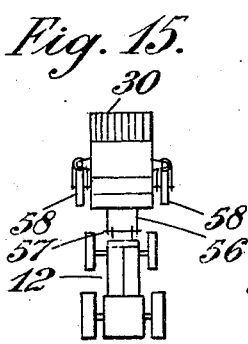

Patented Jan. 24, 1950

2,495,417

UNITED STATES PATENT OFFICE 2,495,417

GRAIN HARVESTING MACHINE

Frederic Whigham McConnel, Liphook, and Douglas Raymond Bomford, Evesham, England Application January 2, 1945, Serial No. 571,032
In Great Britain October 20, 1943

10 Claims. (Cl. 56—128)

This application corresponds to the application of Frederic Whigham McConnel and Douglas Raymond Bomford, Serial No. 17,287/43, which was filed in Great Britain on October 20, 1943.

This invention relates to grain harvesting machines, and has for an object to provide a machine which will thresh out the grain from the ear before the stalk is cut from the ground.

According to this invention, a grain harvesting machine comprises a carriage, one or more pairs of beater members rotatably mounted on the carriage and arranged to provide a gap between them for the reception of the ears of grain, gathering members projecting forwardly of the beater members, so as to provide a tapering space which gathers the stalks of the crop together and guides them into said space between the beater members, means for rotating said beater members so that those parts thereof which first engage the crop are moved upwardly, and a casing surrounding the beating members arranged to catch the grain separated from the ears.

Each said beater member may comprise a disc or the like having beater arms arranged on opposite faces thereof, which discs are so fixed to a driving shaft that the beater arms on the opposed faces of adjacent discs are in staggered relationship to one another.

The extent of projection of the beater arms from each disc may diminish as the beater arms extend outwardly, thus providing a tapering space which receives the ears. The leading surface of each beater arm may be inclined rearwardly from a radius with respect to the direction of rotation of the discs.

Each gathering member may comprise a forwardly-extending tapering part the wider portion of which extends on either side of the periphery of a disc. An arcuate trough may be associated with each tapering gathering member so as to encircle a portion of each disc.

A collecting trough may be arranged to extend transversely to the rear of the beaters, and an upwardly-extending conveyor may be associated with the collecting trough so as to deliver the grain to a discharge hopper. In place of a conveyor, the aforesaid discs may be provided with vanes, so as to impel the grain towards an opening in the casing surrounding the beaters.

Means may be provided for adjusting the height of the beaters in relation to the height of the crop. The aforesaid beaters may be driven from the wheels of the carriage, as may also the conveyor when such is provided.

The following is a description of a number of embodiments of the invention, reference being made to the accompanying drawings, in which:

Figure 1 is a side elevation of the apparatus;
Figure 2 is a plan of the construction shown in Figure 1, a part of the casing being shown broken away to show the beater arms;
Figure 3 is an enlarged side elevation of a beater and its associated guide surfaces;
Figure 4 is a plan view of a number of beaters;
Figure 5 is an enlarged plan view of a pair of cooperating projections on two of the beater drums;
Figure 6 is a similar view to Figure 5 of an alternative form of beater;
Figure 7 is a similar view to Figure 3, showing alternative means for collecting the separated grain;
Figure 8 is a plan view of the arrangement shown in Figure 7;
Figure 9 is a vertical section through two adjacent beaters of Figure 7 showing means for preventing leakage of grain between the collecting troughs at the upper sides of the beater;
Figure 10 shows an alternative arrangement to that of Figure 9, and
Figures 11 to 15 are diagrammatic views showing how the apparatus may be associated with a tractor.

Referring to Figures 1 to 5, the apparatus is mounted on a carriage 10 which is connected by a bracket 11 to a power-driven vehicle 12. The carriage may be provided with a pair of land wheels 13, fixed to an axle 14. A sprocket wheel 15 is attached to the axle and drives an intermediate shaft 16 through a chain 17 and a second sprocket wheel 18. The intermediate shaft carries a gear pinion 19 in mesh with a further pinion 20 on a shaft 21. The shaft 21 carries a large sprocket wheel 22 which drives a sprocket wheel 23 on the shaft 25 through a chain 24.

The shaft 25 carries a number of beaters about to be described with reference to Figures 3 to 5. Each of the beaters comprises a disc 26 having a hub portion 27 and a boss 9 within the hub, secured to the shaft 25. Each disc is formed on either side thereof with beater arms 28 which extend outwardly from the hub 27. The beater arms on one side of the disc are arranged in staggered relationship to the beater arms on the other side. As will be seen from Figure 3, the width of each beater arm diminishes as it extends outwardly, as also does its depth in an axial direction, as shown by Figure 4. The leading surface of each beater arm is inclined to a radius, whereas the trailing surface where it joins the disc, is radial. The beaters are assembled side-by-side, so that the hubs meet and the faces of the beater arms of two adjacent discs, where said faces meet the hub, lie on substantially the same circumference, and, as will be seen in Figure 4, a tapering space is thus provided between the beater arms on one disc and the beater arms on the adjacent disc. Each disc has secured on either side of its periphery, an annulus 29 by blades 50. Extending forwardly on each disc is a sheet metal gathering member 30, the width of which, as viewed in plan, diminishes towards its forward extremity so that the space between two adjacent gathering members tapers as it extends towards the beaters and guides the gathered corn-stems between the annular plates 29 of adjacent beaters, into the space between the beater arms where the beater arms strike the ears and loosen the grain. Each gathering member has secured to it an arcuate trough 32 which encircles the lower half of each beater, or each trough may be formed integral with the gathering members.

The beaters may be surrounded by an outer casing having side plates 33 and a curved upper wall 34. The individual gathering members and arcuate troughs may be secured together and to the side plates 33 by two or more transverse members 35, 36. Between the side members 33 is formed a chute 37 extending upwardly from a trough 38 into which the grain is delivered by the beaters. Within the chute is an endless conveyor 39 which delivers the grain into a hopper 40 carried at the other end of the chute and to which may be secured a sack 41. The lower end of the conveyor is located in cross trough 38 and is driven by the shaft 21. The shafts 16, 21 and 25 are all mounted on a sub-frame 45, and the casing 33 surrounding the beaters is attached to the sub-frame by bracket-arms 46.

In order that the apparatus may be adapted for different heights of crops, the sub-frame is supported on the main carriage by means of three screw-jacks 47.

Figure 6 shows an alternative form of beater, in which the discs 26 are of conical form, in which case the beater arms 49 may project the same distance from the discs along the length of the beater arms, thereby facilitating the manufacture.

In the construction shown in Figure 7, the elevator is replaced by arranging the blades 50 mounted between the annular plates 29 to sweep through continuations of the arcuate troughs 59 which are arranged to extend around the upper part of the beater, as shown in Figure 8, leaving an opening 51, shown in Figure 7, through which the grain is swept by the blades.

In the arrangement shown in Figure 10, the continuations of the troughs are secured together by a transverse member 60. In either of these arrangements any leakage between the troughs 59 and the annuli 29 is deflected by baffles 61 so shaped as to direct the grain back again on to the beaters. In Figure 9, the baffles are carried by the troughs 59 while in Figure 10 they are carried by the transverse members 60.

In the construction shown in Figures 1 and 2, and diagrammatically in Figure 14, the carriage is shown pushed by the tractor 12. However, it may be built integral with the tractor, as shown diagrammatically in Figure 11. Alternatively, the carriage may be drawn by the tractor and the apparatus carried by a cantilever arm 52, as shown in Figure 11, so as to be offset from the tractor.

In the arrangement shown in Figure 12, a sub-frame 53 may be pivoted about the back wheel axles of the tractor, and the apparatus is carried by a cantilever arm 54 supported by castor wheel 55.

In the arrangement shown in Figure 15, the carriage for the apparatus is pushed in front of the tractor by means of a frame 56 which may swing about a horizontal axis 57 and the carriage of the apparatus is provided with castor wheels 58.

We claim:

1. A grain harvesting machine comprising a carriage, a number of pairs of beater members having laterally extending projections the members of which pairs are mounted to rotate together on the carriage and arranged to provide a gap between them for the reception of the ears of grain, the opposed faces of each pair of members being provided with said projections in staggered relation, gathering members projecting forwardly and clear of the beater members so as to provide a tapering space which gathers the stalks of the crop together and guides them into the space between the beater members, means for rotating said pairs of beater members so that those parts thereof which first engage the crop are moved upwardly, and a casing disposed above the beater members and adapted to direct the upwardly thrown grain rearwardly.

2. A grain harvesting machine comprising a carriage, a number of discs having laterally extending beater arms arranged on opposite faces thereof, and arranged to provide a gap between them for the reception of the ears of grain, a driving shaft to which said discs are fixed so that the beater arms on the opposite faces of the adjacent pairs of discs move together in staggered relationship, gathering members projecting forwardly and clear of the discs so as to provide a tapering space which gathers the stalks of the crop together and guides them into the space between the beater arms, means for rotating said discs so that those parts of the beater arms which first engage the crop are moved upwardly, and a casing disposed above the beater arms and adapted to direct the upwardly thrown grain rearwardly.

3. A grain harvesting machine comprising a carriage, a number of discs rotatably mounted on the carriage and having laterally extending beater arms on opposite faces thereof which discs are arranged so as to provide a gap between them for the reception of the ears of grain and which beater arms project from the discs in a diminishing manner as they extend outwardly and so that the beater members on opposed faces of adjacent discs are in staggered relationship, gathering members projecting forwardly and clear of each disc so as to provide a tapering space which gathers the stalks of the crop together and guides them into the space between the beater arms, means for rotating said discs and beater arms so that those parts of the arms which first engage the crop are moved upwardly, and a casing disposed above the beater arms and adapted to direct the upwardly thrown grain rearwardly.

4. A grain harvesting machine comprising a carriage, a number of discs rotatably mounted on the carriage and having secured laterally extending beater arms on either side thereof which discs are arranged to provide between them a gap for the reception of the ears of grain and which arms project from said discs in a diminishing manner as they extend outwardly and are also inclined rearwardly from a radius with respect to the direction of the rotation of the discs and so that the beater members on opposed faces of adjacent discs are in staggered relationship, gathering members projecting forwardly and clear of the beater arms so as to provide a tapering space which gathers the stalks of the crop together and guides them into the space between the beater arms, means for rotating said discs and beater arms so that those parts of the arms which first engage the crop are moved upwardly, and a casing disposed above the beater arms and adapted to direct the upwardly thrown grain rearwardly.

5. A grain harvesting machine comprising a carriage, a number of discs rotatably mounted on the carriage and having secured thereto laterally extending beater arms on opposite faces thereof which discs are arranged so as to provide between them a gap for the reception of the ears of grain and which project from said discs in a diminishing manner as they extend outwardly and are also inclined rearwardly from a radius with respect to the direction of the rotation of the discs and the surface of each of which beater arms is curved in a plane at right angles to the radius of the disc, gathering members projecting forwardly and clear of the beater arms so as to provide a tapering space which gathers the stalks of the crop together and guides them into the space between the beater arms, means for rotating said discs and beater arms so that those parts of the arms which first engage the crop are moved upwardly, and a casing disposed above the beater arms and adapted to direct the upwardly thrown grain rearwardly.

6. A grain harvesting machine comprising a carriage, a number of discs having laterally extending beater arms arranged to project from opposite faces thereof which discs are arranged to provide a gap between them for the reception of the ears of grain the opposed faces of each pair of discs being provided with said beater arms in staggered relationship, gathering members in front and clear of the beater members and each comprising a forwardly extending tapering part, the wider portion of which is channel-shaped and arranged so that the flanges extend on either side of the forward part of the discs to provide a tapering space which gathers the stalks of the crop together and guides them into said space between the beating members, means for rotating said discs and beater arms so that those parts of the arm which first engage the crop are moved upwardly, and a casing disposed above the beater arms and adapted to direct the upwardly thrown grain rearwardly.

7. A grain harvesting machine comprising a carriage, a number of discs having beater arms arranged to project from the faces thereof which discs are arranged to provide a gap between them for the reception of the ears of grain and which beater arms on the opposed faces of adjacent discs are in staggered relationship, gathering members in front and clear of the beater members and each comprising a forwardly extending tapering part, the wide portion of which is channel-shaped and so arranged that the flanges extend on either side of the forward part of the discs to provide a tapering space which gathers the stalks of the crop together and guides them into the space between the beating members, an arcuate trough secured to each tapering gathering member so as to encircle the lower portion of each disc and means for rotating said discs so that those parts of the beating members which first engage the crop are moved upwardly and a casing disposed above the beater members and adapted to direct the upwardly thrown grain rearwardly.

8. A grain harvesting machine comprising a carriage, a number of pairs of beater members rotatably mounted on the carriage and arranged to provide a gap between them for the reception of the ears of grain projections on the beating members of each pair arranged in staggered relationship, gathering members projecting forwardly and clear of the beater members so as to provide a tapering space which gathers the stalks of the crop together and guides them into the space between the beater member, means for rotating said beater members so that those parts thereof which first engage the crop are moved upwardly, and a casing disposed above the beater members and adapted to direct the upwardly thrown grain rearwardly, and a collecting trough arranged to extend transversely to the rear of the beaters and an upwardly extending conveyor having its lower end in said collecting trough and a discharge hopper connected with its upper end.

9. A grain harvesting machine comprising a carriage, a number of discs having beater arms arranged on opposite faces thereof so that the beater arms on the opposed faces of each pair are in staggered relationship, which discs are arranged to provide a gap between them for the reception of the ears of grain, a driving shaft to which said discs are fixed so as to rotate together, a gathering member projecting forwardly and clear of the discs so as to provide a tapering space which gathers the stalks of the crop together and guides them into the space between the beater arms, means for rotating said beater arms so that those parts thereof which first engage the crop are moved upwardly, a casing disposed above the beater members, and blades attached to said discs and adapted to impel the grain upwardly into said casing.

10. A grain harvesting machine comprising a carriage, a number of pairs of beater members rotatably mounted on the carriage and arranged to provide a gap between them for the reception of the ears of grain, projections on said beater members arranged in staggered relationship, gathering members projecting forwardly and clear of the beater members so as to provide a tapering space which gathers the stalks of the crop together and guides them into the gap between the beater members, means for rotating said beater members so that those parts thereof which first engage the crop are moved upwardly, and a casing disposed above the beater members and adapted to direct the upwardly thrown grain rearwardly, and a cantilever frame on said carriage for mounting the beaters so that they are offset to one side of the carriage.

FREDERIC WHIGHAM McCONNEL.
DOUGLAS RAYMOND BOMFORD.

REFERENCES CITED

The following references are of record in the file of this patent:

UNITED STATES PATENTS

| Number | Name | Date |
| --- | --- | --- |
| 696,460 | Maloney | Apr. 1, 1902 |
| 1,056,967 | Bradley | Mar. 25, 1913 |
| 1,379,112 | Luedke | May 24, 1921 |
| 1,628,038 | Draper | Apr. 10, 1927 |
| 1,974,410 | Caughey | Sept. 25, 1934 |
| 2,115,234 | Preston | Apr. 26, 1938 |

FOREIGN PATENTS

| Number | Country | Date |
| --- | --- | --- |
| 572,040 | Great Britain | Sept. 20, 1945 |